United States Patent
Butterfield et al.

(10) Patent No.: US 6,293,568 B1
(45) Date of Patent: Sep. 25, 2001

(54) STORING AND TRANSPORTING FLEXIBLE SHEETS

(75) Inventors: Floyd S. Butterfield, 5996 Buena Vista Dr., Paso Robles, CA (US) 93446; Michael S. O'Keefe, Paso Robles, CA (US)

(73) Assignee: Floyd S. Butterfield, Paso Robles, CA (US)

( * ) Notice: Subject to any disclaimer, the term of this patent is extended or adjusted under 35 U.S.C. 154(b) by 0 days.

(21) Appl. No.: 09/083,740

(22) Filed: May 22, 1998

(51) Int. Cl.[7] .................................................. B62D 39/00
(52) U.S. Cl. ................ 280/33.995; 280/47; 280/47.131; 280/47.17; 280/47.19; 280/47.24; 280/47.26; 211/150
(58) Field of Search ................................ 280/33.995, 47, 280/47.131, 47.17, 47.19, 47.24, 47.26, 47.12, 79.2; 211/50

(56) References Cited

U.S. PATENT DOCUMENTS

| | | | |
|---|---|---|---|
| D. 332,335 | | 1/1993 | Casad ..................................... D34/24 |
| 3,279,348 | * | 10/1966 | Kinnard ............................. 280/47.26 |
| 3,445,150 | * | 5/1969 | Zartarian . |
| 3,876,223 | * | 4/1975 | O'Reilly et al. ................... 280/47.26 |
| 4,043,485 | * | 8/1977 | Tippetts .................................. 211/50 |
| 4,094,526 | * | 6/1978 | Clarke et al. ........................ 280/79.2 |
| 4,217,985 | * | 8/1980 | Nasgowitz ............................. 211/50 |
| 4,247,130 | * | 1/1981 | Paterson ........................... 280/47.26 |
| 4,765,503 | | 8/1988 | Otto et al. ............................... 220/74 |
| 5,005,709 | * | 4/1991 | Stokes .................................... 211/50 |
| 5,033,759 | * | 7/1991 | Wix .................................. 280/47.19 |
| 5,088,750 | | 2/1992 | Beese et al. ....................... 280/47.26 |
| 5,096,368 | | 3/1992 | Butterfield ............................ 414/786 |
| 5,159,875 | | 11/1992 | Cohen .................................... 100/34 |
| 5,181,460 | * | 1/1993 | Gremelsbacker ...................... 211/50 |
| 5,244,220 | * | 9/1993 | Cortez ............................... 280/47.26 |
| 5,333,885 | * | 8/1994 | Pullman ............................ 280/47.19 |
| 5,378,005 | * | 1/1995 | Norton ............................... 280/47.26 |
| 5,388,506 | * | 2/1995 | Vargas et al. ...................... 211/50 X |
| 5,394,997 | * | 3/1995 | Gollob .................................... 211/50 |
| 5,415,514 | * | 5/1995 | Butterfield ............................. 211/50 |
| 5,445,397 | | 8/1995 | Evans ................................ 280/47.18 |
| 5,458,350 | * | 10/1995 | Johnston et al. .................. 280/47.26 |
| 5,480,187 | | 1/1996 | Binning .............................. 280/79.2 |
| 5,542,551 | * | 8/1996 | Smith .................................... 211/50 |
| 5,671,933 | * | 9/1997 | Tucker ............................... 280/47.19 |
| 5,862,980 | * | 1/1999 | Samuelson ....................... 211/50 X |
| 5,893,572 | * | 4/1999 | Parks ..................................... 280/26 |
| 5,899,468 | * | 5/1999 | Apps et al. ....................... 280/47.26 |

OTHER PUBLICATIONS

Otto Industries, Inc., MSD Cart Product Specification, 1 page.

* cited by examiner

Primary Examiner—Lanna Mai
Assistant Examiner—Toan To
(74) Attorney, Agent, or Firm—Christie, Parker & Hale, LLP (57) ABSTRACT

A container for a stack of newspapers includes bottom, side, and back walls and a substantially open front to facilitate stacking newspapers in the container, and inspecting the stack for non-paper contaminants. A pair of rotatable wheels on the bottom of the container, and a base on the bottom of the container are adapted to rest on a horizontal supporting surface such as a floor. A pair of inwardly extending lips on the front of the container restrain the stack of papers when the container is tilted and rolled from one location to another. The container bottom slopes downwardly away from the open front of the container, and the back of the container slopes upwardly away from the open front to promote forming a stack which is slightly inclined to vertical when the container rests on the horizontal surface. External means on the container facilitate picking up the container and dumping the stack of papers in a collection truck.

8 Claims, 6 Drawing Sheets

STORING AND TRANSPORTING FLEXIBLE SHEETS

CROSS-REFERENCE TO RELATED APPLICATIONS

Not applicable.

STATEMENT REGARDING FEDERALLY SPONSORED RESEARCH AND DEVELOPMENT

Not applicable.

BACKGROUND OF THE INVENTION

1. Field of the Invention

This invention relates to containers for storing and transporting a stack of paper sheets to facilitate recycling the paper.

2. Description of the Related Art

For many years used newspapers and the like have been collected and recycled to conserve resources, and to reduce the amount of material incinerated or sent to landfills. However, large quantities of waste paper still are not recycled because the paper cannot be collected efficiently and economically. For example, various types of containers have been provided for the accumulation of industrial, commercial and residential waste paper. These containers either have opaque walls, which conceal the contents, or are so small that only small amounts of paper can be stored in them. In the first instance, some people who discard recyclable paper often mix non-paper contaminants, such as glass or plastic containers, waste food, metal cans, and other garbage, with the paper sheets. This is unacceptable to those in the business of recycling paper, and discourages collection of waste paper. In the second instance, only relatively small amounts of waste paper can be stored in the small containers. This makes pickup of the accumulated paper inordinately time-consuming and uneconomical.

Because of the above shortcomings, a large amount of available waste paper is never recovered for recycling.

BRIEF SUMMARY OF THE INVENTION

This invention provides containers in which stacks of relatively large amounts of waste paper, such as newspaper, can be compactly stored, and easily inspected by a collector of the paper to ascertain that the stack is not contaminated with non-paper refuse. Moreover, the containers of this invention make it easy to move a collected stack of large amounts of recyclable paper to a convenient location for rapid and economical pickup by a recycler.

In brief, the preferred container of this invention is in the shape of an elongated upright box with a bottom slightly larger in size and shape than a typical newspaper folded in half. The container includes a front, which is substantially open, and a bottom, two sides and a back, which are substantially closed. A pair of rotatable wheels are mounted on the lower end of the container, which has a base adapted to rest on a substantially horizontal supporting surface, such as a floor. The open front of the container permits the easy stacking of horizontal sheets of paper to any convenient height, say 3 to 7 feet, and also permits quick and easy inspection of the stack of paper sheets in the box to ascertain that the stack is not contaminated with non-paper material. Thus, a stack of uncontaminated recyclable paper weighing 200 or more pounds can be stored, even by the typical residential dweller. Once the container is substantially full, it can easily be tilted to be supported only by the wheels, and thereafter rolled to an appropriate location, say curbside, for pickup by a recycler. Preferably, the containers of this invention include lifting means which make it possible for either a fully automatic or semi-automatic recycle truck to lift and invert the container to dump the stack of paper into the collection truck. The container is then returned to the curbside position for reuse.

In one form of the invention, the open front of the container includes inwardly extending lips which are perpendicular to the sidewalls to confine the stack of papers in the container as it is tilted or otherwise moved. Preferably, the horizontal distance between the inner edges of the lips is slightly less than the width of the stack within the container. This facilitates stacking sheets of paper in a horizontal orientation and complete inspection of the stack for unacceptable contaminants. It also promotes easy dumping of the stack when the container is inverted.

In another form of the invention, the container bottom slopes downwardly and away from the open front of the container when the container base rests on a horizontal surface. This promotes formation of a stable stack which rests securely against the back of the container. In the preferred form, the bottom of the container is at an angle between about 2° and about 12° from horizontal when the container base rests on a horizontal support.

In another form of the invention, the back wall of the container slopes upwardly and away from the open face of the container at an angle between about 2° and about 12° from vertical when the container base rests on a substantially horizontal support. This also promotes formation of a stable stack which rests firmly against the back of the container.

To facilitate tilting the container to rest only on the wheels, a step plate is mounted on the bottom of the container front to extend away from the container in a direction transverse to the axis of the rotation of the wheels, which can be mounted either at the front or the back of the container.

DETAILED DESCRIPTION OF THE INVENTION

Figure 1:
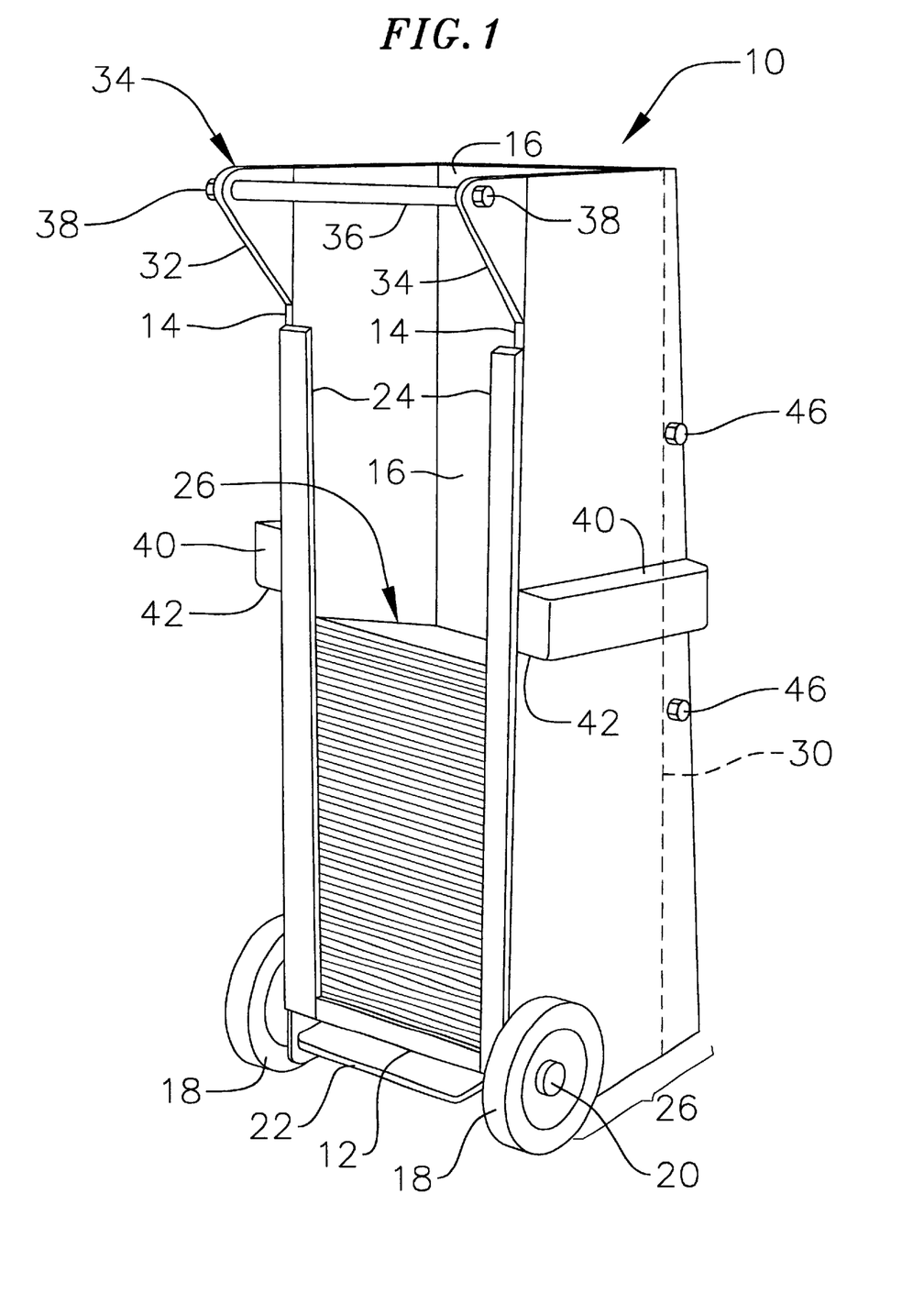
FIG. 1 is a perspective view of a container with wheels mounted at the open front.
Figure 2:
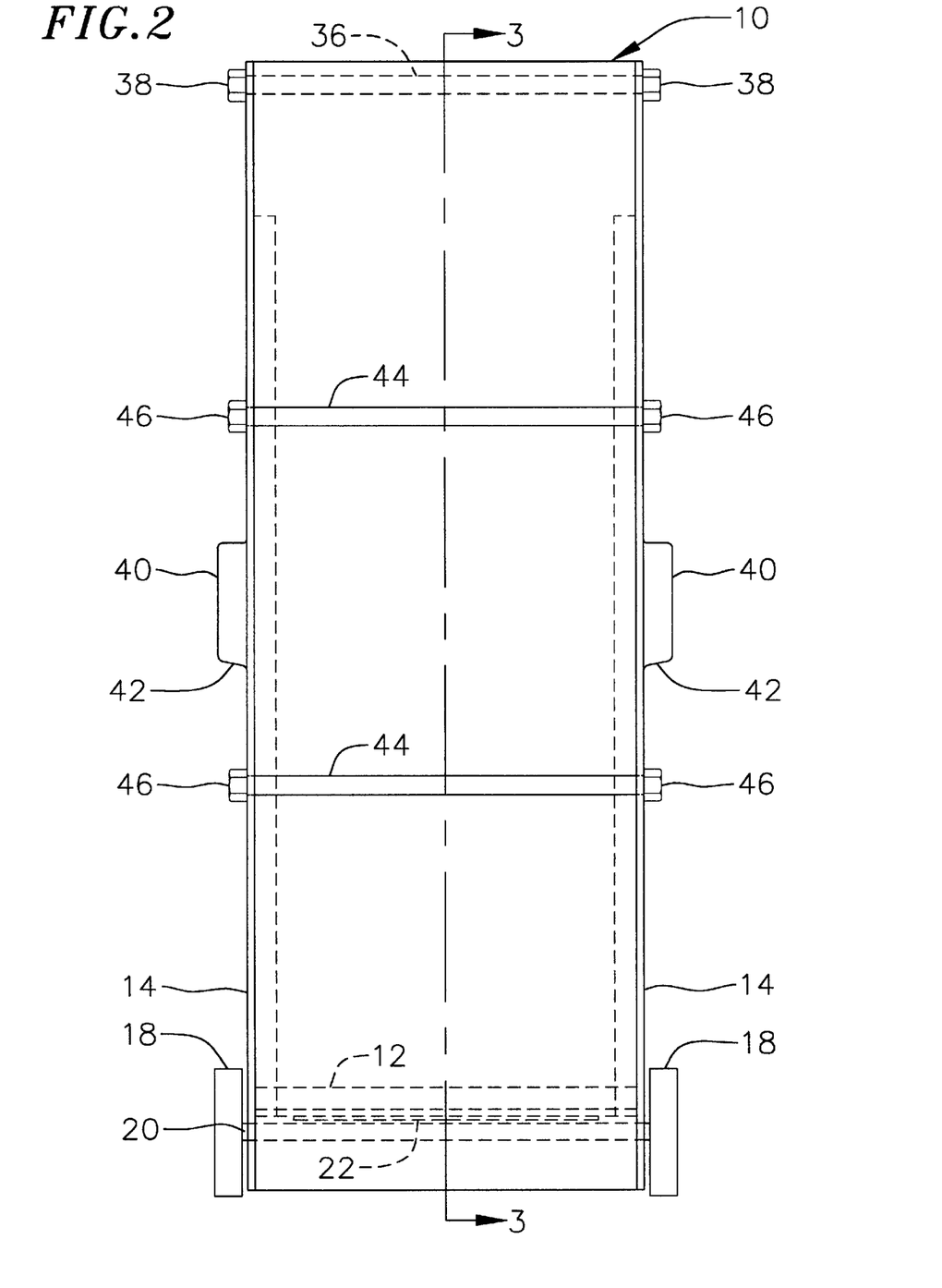
FIG. 2 is an elevational view of the back of the container shown in FIG. 1.
Figure 3:
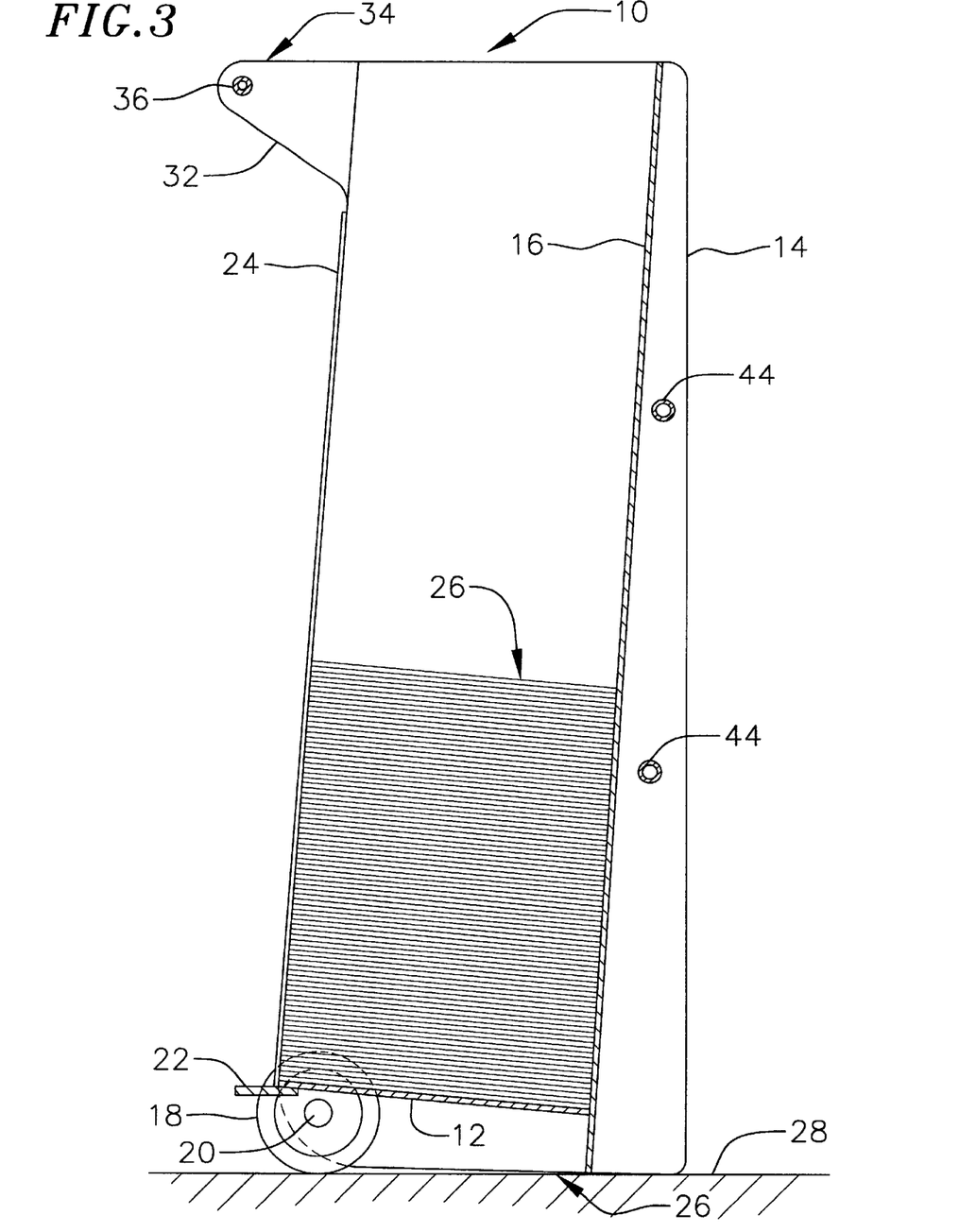
FIG. 3 is a view taken on line 3—3 of FIG. 1.

Referring to FIGS. 1, 2 and 3, container 10 includes a substantially horizontal bottom wall 12, identical upright and parallel sidewalls 14, and an upwardly extending back wall 16. The rear edge of the bottom wall is secured along a horizontal line to a lower part of the back wall. Each side edge of the bottom wall is each secured to a lower portion of a respective side wall.

A pair of rotatable wheels 18 are mounted on opposite ends of a horizontal axle 20 secured through the forward lower portions of the sidewalls 14 just below the container bottom 12. A substantially horizontal step plate 22 is secured to the underside of the front edge of the bottom wall to provide a step to facilitate tilting the container as described below. The step plate is almost the same width as the bottom wall, and extends three to five inches forward of the front edge of the bottom wall.

As shown in FIG. 1, a separate upright and elongated lip or retainer 24 is secured to the forward edge of each side plate 14 and bottom plate 12 to extend almost to the top of the container. The lips also extend inwardly a relatively short distance toward each other so the front of the container is still left substantially open. This facilitates forming a stack 26 of recyclable paper, such as newspapers, in the container. The horizontal distance between the inner edges of the lips is slightly less than the width of the stack, and the horizontal dimension of each lip from front to back is substantially less than that of the sidewalls. Thus the lips leave room for a flat stack of papers in the container, and also prevent the stack from falling out of the container as the container is moved to transport the stack as described below.

As shown in FIG. 3, each side wall is in the shape of a trapezoid with parallel top and bottom edges, and which tapers outwardly from top to bottom. The lower edges of the sidewalls and the wheels 18 form a base 26 adapted to rest on a flat horizontal supporting surface 28. The lower edge of the back wall 16, which is an elongated upwardly extending rectangle, is coterminous with the lower edges of the side plates, and also forms part of the base 26. The back wall 16 extends upwardly away from the front of the container at a slight angle to vertical when the container base rests on the supporting surfaces 28 as shown in FIG. 3. The opposite edges of the back wall are each secured to the inner surfaces of the rear portion of a respective side wall. The bottom 12 of the container slopes gently downwardly away from the open face of the container when the container is at the rest position shown in FIG. 3. The angle at which the bottom slopes relative to horizontal when the container is in the rest position as shown in FIGS. 1–3 can be any suitable amount. Good results are obtained when the bottom slopes between about 2° and about 12° relative to horizontal with the container in the rest position shown in FIG. 3. The back wall preferably slopes from vertical at an angle between about 2° and about 12° when the container is at rest as shown in FIG. 3. Conveniently, the bottom wall 12 is substantially perpendicular to the back wall 16. In the preferred embodiment, both the bottom wall 12 and the back wall 16 slope slightly as shown in FIG. 3 because this facilitates easy formation of a stable stack of a large amount of recyclable paper when the container is in the rest position shown in FIG. 3. However, the container could have a horizontal bottom wall with a sloping back wall, or a sloping bottom wall with a vertical back wall, or the bottom wall could be horizontal and the back wall vertical. With the latter arrangement, the lips retain the stack in the container as it is tilted and rolled from one location to another as described below. With either the bottom wall or the back wall sloping as shown in FIG. 3, the retaining lips may be omitted, although they are preferred because of the extra security they provide during formation and transportation of the stack.

The phantom line 30 shown in FIG. 1 indicates the line along which one side edge of the back wall is secured to the inner face of a side wall.

As shown in FIGS. 1 and 3, a separate triangle-shaped plate 32 is secured to the forward edge of the upper end of each side plate 14 to provide outwardly extending parallel brackets 34. An elongated horizontal tubular handle 36 extends through the upper and outer ends of the brackets, and is secured to them by a respective nut 38 threaded onto each end of the handle. As shown in FIG. 3, the brackets 34 support the handle at a substantial distance, say three to eight inches in front of the forward edges of the sidewalls, to facilitate tilting and dumping the stack of paper when the container is inverted as described below.

Separate outwardly extending and horizontal lifting bars 40 secured to the exterior and midpoint of each side wall provide horizontal and downwardly facing shoulders 42 to receive fully automated lifting arms (not shown) used by some refuse trucks to pick up and invert conventional trash containers. Each lifting bar extends from the front to the rear edge of its respective side wall.

A pair of horizontal and vertically spaced tubular lifting rods 44 extend through the rear portions of the sidewalls 14 to the rear of the back wall 16, and are secured in place by nuts 46 threaded on the respective ends of the lifting rods. The vertical space between the lifting rods is set to receive semi-automated lifting forks (not shown) employed by some refuse trucks to pick up, invert, and dump contents from conventional containers.

The container shown in FIGS. 1–3 is used by placing sheets (say, newspapers folded in half) of recyclable paper with the major planes of the sheets disposed horizontally to form the stack 26 shown in FIGS. 1 and 3. The relatively wide open structure of the front of the container makes it easy to form the stack of paper sheets, and the sloping bottom and back walls of the container promote the formation of a stable stack which slopes slightly away from the open front of the container, and rests securely against the back wall.

Once the container is suitably filled, say to a height of 3 to 6 feet, it holds a stack of paper weighing from 150 to 300 pounds. Even so, the container with the heavy load is easily moved to a paper pickup point, say at the curbside of a residence served by a pickup service for recyclable paper, by placing one foot on the step plate 22, and pulling the handle 36 to lift the rear of the container out of contact with the supporting surface. Thereafter, the container is rolled to the desired pickup point, where it can be picked up either fully or semi-automatically and inverted over a collection truck to dump the stack from the container. The high position of the handle facilitates tilting the container, and the location of the handle 36 away from the container opening facilitates dumping. The lips 24 on the front of the container ensure that the stack, which is wider than the opening between the lips, cannot slide from the container when it is tilted.

The open front of the container makes it easy for the collector of the paper to inspect the entire stack quickly to ensure that it is not contaminated with unacceptable refuse. If it is, the collector can decline to accept the stack. This encourages the user of the container to be sure that the stack of papers is uncontaminated. Moreover, the relatively large stack of papers in the container provides an economical load for the collector, thus encouraging recycling of the paper.

The container is constructed of metal parts, which can easily be welded together. Alternatively, it is molded integrally from any suitable plastic.

The container can have any suitable dimensions. For example, the back wall can be 40 to 60 inches high, and between about 14 and about 18 inches wide. The side walls are about the same height as the back wall, and are between 12 and 18 inches from front to back. The bottom wall is of appropriate size to accommodate the side and back walls. The horizontal spacing between the retaining lips at the front of the container should be the maximum possible to facilitate loading of papers in the container and dumping a stack of papers from the container. However, the spacing should not be so large as to permit the stack to slide from the container as it is tilted and moved. Ordinarily, horizontal spacing between about 8 inches and about 12 inches is suitable for most types of newspapers, and the like. The horizontal width of the lips can be between about 2 inches and about 3½ inches. The wheels can be of any suitable size. Larger wheels make the container easier to tilt and handle, but require more space. Wheels with diameters between about 3 inches and about 10 inches are satisfactory for most purposes.

Figure 4:
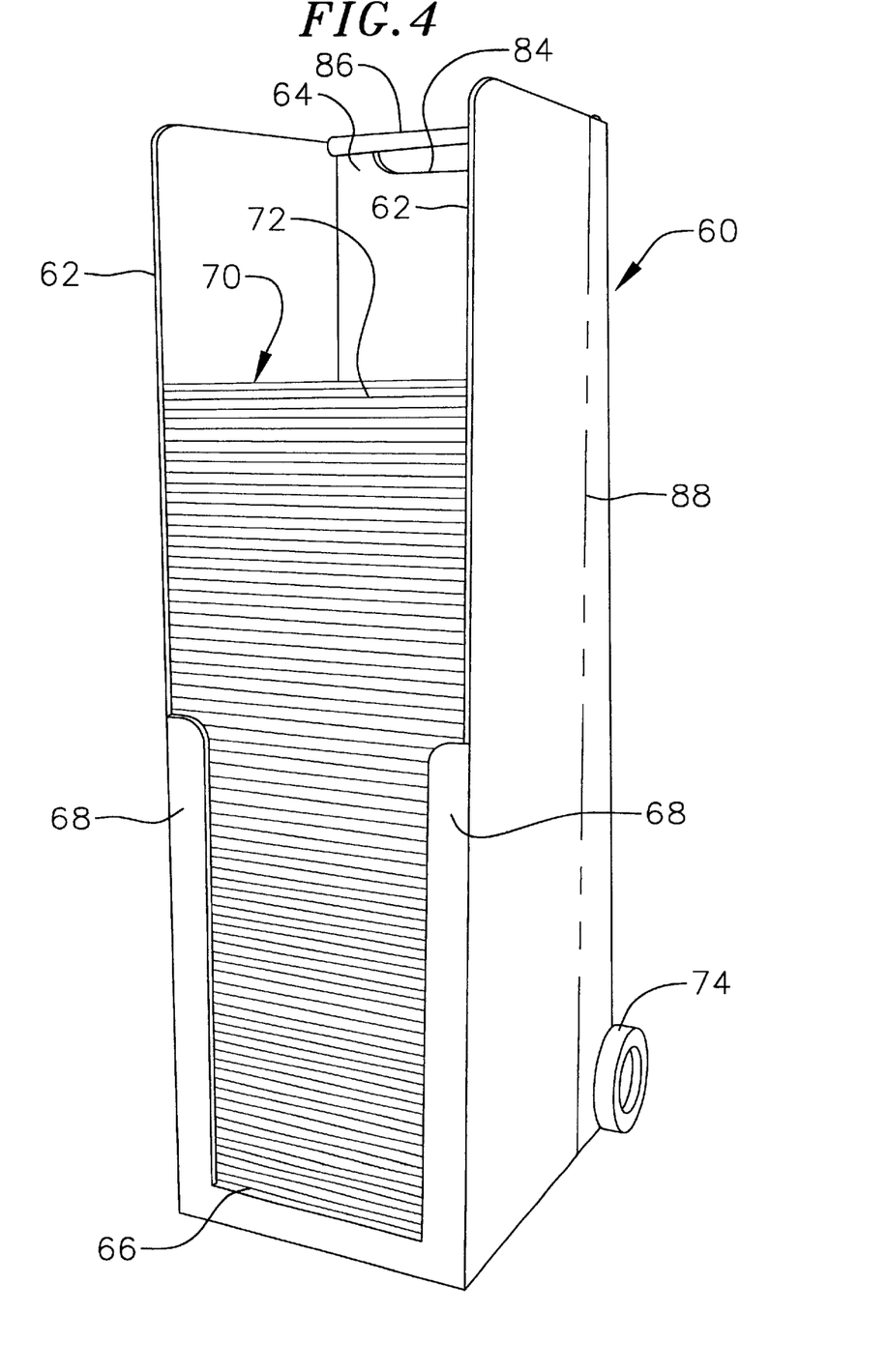
FIG. 4 is a perspective view of a container with wheels mounted at the back.
Figure 5:
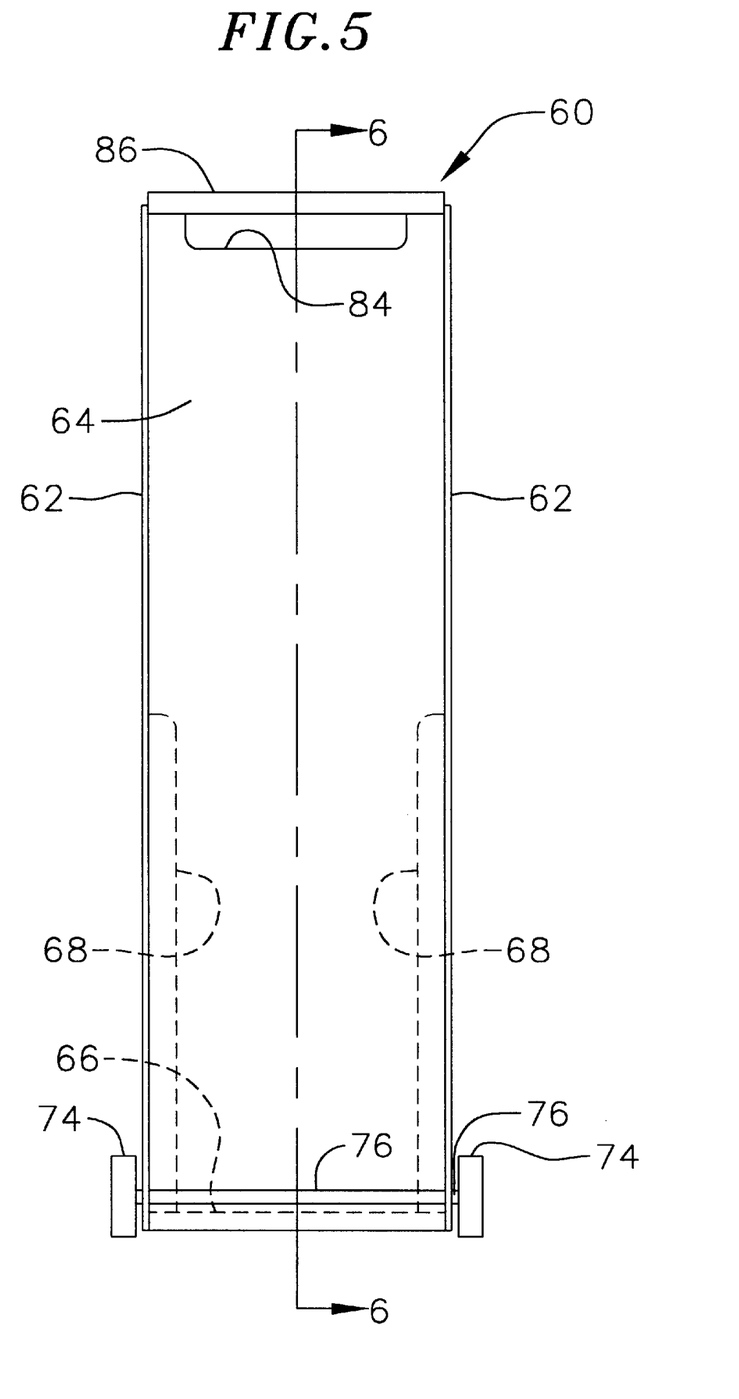
FIG. 5 is a view of the back of the container shown in FIG. 4.
Figure 6:
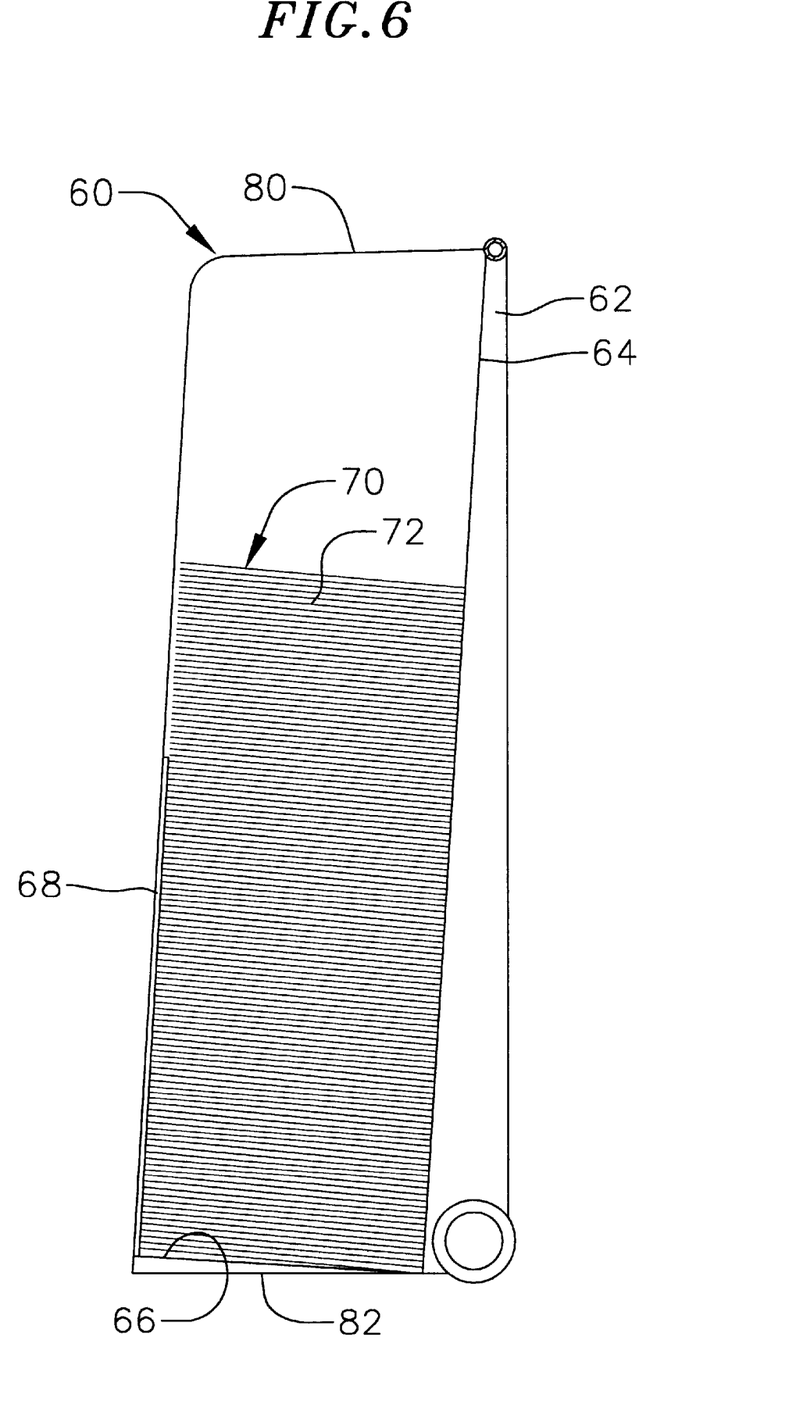
FIG. 6 is a view taken on line 6—6 of FIG. 1.

FIGS. 4, 5 and 6 show an alternate embodiment of the invention. A container 60 includes a pair of vertical identical sidewalls 62 and an upwardly extending back wall 64 secured at opposite edges to rear portions of the sidewalls. A substantially horizontal bottom wall 66 is secured at opposite edges to the lower edges of the side walls, and at its rear edge to a lower part of the back wall.

A separate inwardly extending lip 68 is secured to the lower portion of the front edge of each side wall to restrain a stack 70 of horizontal sheets 72 or recyclable paper. As with the embodiment of FIGS. 1–3, the horizontal distance between the inner edges of the lips 68 is less than the width of the stack. Preferably, the horizontal distance between the inner edges of the lips is between about 70% and about 95% of that between the inner faces of the side walls.

A pair of rotatable wheels 74 are mounted on opposite ends of a horizontal axle 76 journaled through the lower rear portions of the sidewalls 62, which each are of a trapezoidal shape with parallel top and bottom edges 80 and 82, respectively. As shown best in FIG. 6, the lower edge of each side plate is slightly longer than the upper edge. The back wall 64 extends at a slight angle upwardly and away from the front of the container. Phantom line 88 shows the position of one edge of the back wall against a side wall of the container. The bottom wall extends downwardly and away from the front of the container so the bottom and back walls are mutually perpendicular. An upwardly opening notch 84 in the upper edge of the central portion of the back wall facilitates gripping a horizontal handle 86, which is welded to the upper edge of the back wall across the notch 84.

The container of FIGS. 4–6 is used in a manner similar to that for the container FIGS. 1–3. After papers are stacked to a suitable height, the container is tilted by placing one foot on the axle 76, and pulling the handle 86 to lift the forward edge of the container so it is supported only by the wheels. The container is then rolled to a desired location for pickup and dumping.

In an alternate embodiment, the wheels need not be mounted on the container. Instead, the wheels can be on a separate dolly with a platform which fits under the container. With such an arrangement, the dolly platform is preferably placed under the container before it is fully loaded with the paper.

One advantage of the embodiment shown in FIGS. 4–6 is that lips are not required to retain the stack of papers as the container is tilted to be supported only on the wheels. Accordingly, the lips could be omitted, except they provide additional security as the container is rolled and brought to a stop at the pickup location. An advantage of the embodiment shown in FIGS. 1–3 is that it is easily stored with the back wall against the wall of a room, garage, or the like, leaving the open front of the container easily accessible for loading paper sheets to form the stack. However, in either embodiment, the container provides an easy way to accumulate a relatively large amount of recyclable paper in a dense stack which can be quickly inspected to ensure that it is uncontaminated. This promotes cost-efficient recycling of paper.

What is claimed is:

1. A container for storing a stack of substantially horizontal sheets on a substantially horizontal support, the container comprising a base being adapted to rest on the substantially horizontal support, a pair of upright sidewalls spaced from each other and secured to, a bottom wall, wherein the bottom wall is located adjacent to the base, an upwardly extending back wall disposed between the sidewalls, the front of the container being substantially open to facilitate loading sheets in the container with the sheets being generally horizontal to form a stack of sheets in the container, and to facilitate inspection of the stack for any contaminants in it, a separate inwardly extending retainer at the front edge of each side wall, the retainers extending toward each other so the horizontal distance between them is substantially uniform, each retainer having a horizontal dimension from front to back substantially less than that of the sidewalls, wheels mounted at bases of the container to rotate about a substantially horizontal axis adjacent the front of the container so the container can be tilted out of contact with the support and rolled on the wheels to transport the stack of sheets in the container, and a handle secured to an upper part of the front of the container to facilitate tilting the loaded container.

2. A container according to claim 1 in which the horizontal distance between the retainers is at least about 8".

3. A container according to claim 1 or 2 in which the handle extends forward of the container to facilitate dumping the stack when the container is inverted.

4. A container according to claim 1 or 2 in which the back wall extends upwardly and away from the front of the container to form an inclined support for the stack when the base of the container sets on the horizontal support.

5. A container according to claim 1 or 2 in which the bottom wall slopes downwardly from the front to the back of the container when the base of the container rests on the horizontal support.

6. The container according to claim 1 or 2 in which the back wall extends upwardly and away from the front of the container to form an inclined support for the stack when the base of the container rests on the horizontal support, and the bottom wall slopes downwardly from the front to the back of the container when the base of the container rests on the horizontal support.

7. A container according to claim 1 or 2 which includes a forwardly extending step plate at the front of the lower portion of the container to facilitate tilting the container to rest only on the wheels.

8. A container according to claim 1 or 2 which includes lifting means on the exterior of the container to facilitate automatic pick-up, inverting an dumping the container.

* * * * *

UNITED STATES PATENT AND TRADEMARK OFFICE
CERTIFICATE OF CORRECTION

PATENT NO.      : 6,293,568 B1
DATED           : September 25, 2001
INVENTOR(S)     : Floyd S. Butterfield and Michael S. O'Keefe

It is certified that error appears in the above-identified patent and that said Letters Patent is hereby corrected as shown below:

<u>Title page,</u>
Item [56], References Cited, U.S. PATENT DOCUMENTS, replace
"5,458,350 10/1995 Johnston et al  …….. 280/47.26" with
-- 5,458,350 10/1995 Johnson et al  ……. 280/47.26 --.

<u>Column 6,</u>
Line 14, after "comprising a" insert -- front, a base, the --.
Line 28, replace "bases" with -- the base --.
Line 43, replace "sets" with -- rests --.
Line 61, replace "an" with -- and --.

Signed and Sealed this

Eighth Day of April, 2003

JAMES E. ROGAN
*Director of the United States Patent and Trademark Office*